Figure 1:
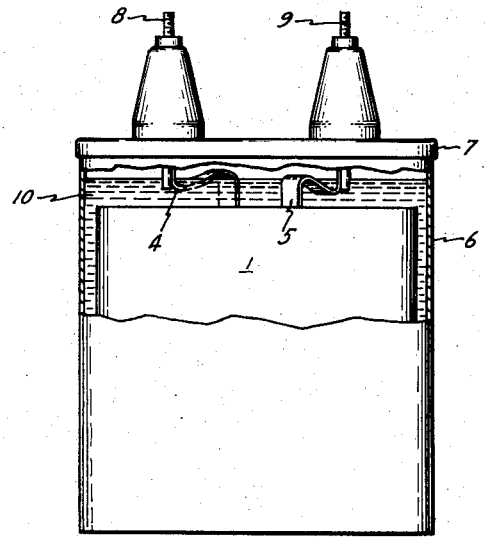

June 9, 1959  J. R. HUTZLER ET AL  2,890,396
CAPACITOR
Filed Aug. 30, 1955

Inventor
John R. Hutzler,
Stephen W. Pease,
by Gilbert P. Tarleton
His Attorney.

United States Patent Office 2,890,396
Patented June 9, 1959

2,890,396

CAPACITOR

John R. Hutzler, Fort Edward, and Stephen W. Pease, South Glens Falls, N.Y., assignors to General Electric Company, a corporation of New York Application August 30, 1955, Serial No. 531,430

6 Claims. (Cl. 317—258)

The present invention relates to capacitors, and more particularly to capacitors having an improved dielectric material which adapts them for high temperature, high voltage applications.

Capacitor dielectrics have been made heretofore of such material as kraft paper or other cellulosic materials, but while such dielectric material is sufficiently flexible to permit handling for winding into capacitor rolls and may be endowed with adequate dielectric strength by suitable impregnation with solid resinous materials or dielectric liquid such as chlorinated diphenyl or mineral oil, this type of dielectric base material cannot generally withstand high temperatures and is suitable for use only below 85° C. when treated with chlorinated diphenyl and below 125° C. when treated with mineral oil or resins. Other dielectric base materials such as certain plastic films which are more thermally stable than the above cellulosic dielectric have been suggested, but these have not had the requisite dielectric constant or are otherwise unsuitable, as, for example, due to their high cost or scarcity.

A further type of prior known capacitor dielectric materials is mica. This material has been used for high frequency applications and is characterized by high dielectric constant, low power factor, and good resistance to high temperature, high voltage conditions. Natural mica sheets or splittings have been used for such dielectrics, but this material is not satisfactory due to its brittleness, high cost and unavailability. Dielectric paper made from reprocessed or recombined mica, formed of natural mica broken up into minute flakes and recombined into a continuous mat or sheet, has been more recently suggested for use, as disclosed in copending application Serial No. 400,848, Ruscetta and Foster, filed December 29, 1953, and assigned to the same assignee as the present invention, but this material is still relatively brittle and does not have the necessary mechanical strength for proper assembly into wound or rolled type capacitors.

It is the object of the present invention to provide an improved electric capacitor which is especially suitable for high temperature conditions and which overcomes the above-mentioned disadvantages of prior types of capacitors.

It is a further object of the invention to provide an improved capacitor which is economical to produce, simple in construction, efficient in operation and which has extended life under high temperature and high voltage conditions.

It is still another object of the invention to provide a dielectric medium which confers the above desirable properties to an electric capacitor used for high temperature applications.

It has been found in accordance with the invention that a superior high temperature capacitor adapted for use in a temperature range of 150–250° C. is comprised, in its broad aspects, of spaced electrically conducting armatures and a dielectric material between the armatures which is composed of minute flakes of mica recombined into the form of a mat, the mat being impregnated with a silicone resin and being permeated in the capacitor with a silicone oil insulating liquid.

Figure 2:
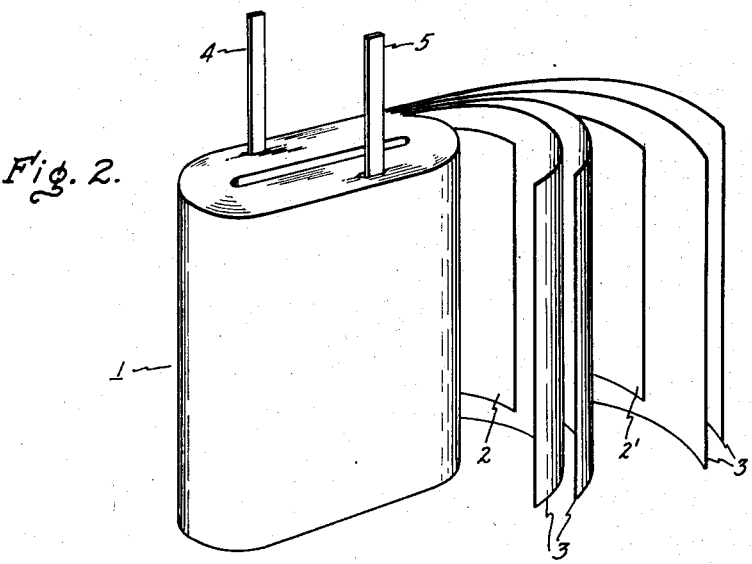

The invention will be better understood by reference to the following description taken in conjunction with the accompanying drawing in which:

Fig. 1 is a view partly in section of a capacitor in which the improved dielectric material may be incorporated; and Fig. 2 is a perspective view of the wound capacitor section of the Fig. 1 device showing the section partially unrolled.

Referring now to Fig. 1 of the drawing, there is shown an electric capacitor comprising an outer casing 6 containing a rolled capacitor section 1 made up in a conventional arrangement of wound alternate layers of metal 2, 2′ and dielectric sheets 3, shown in detail in Fig. 2. The metallic foils 2, 2′ serve as the capacitor electrodes or armatures and may be composed of aluminum foil or other suitable electrode material. Electrical contact with armatures 2, 2′ is made by tap straps 4 and 5 of conducting material which are applied to the armatures and project from the end of the capacitor section. In the assembled capacitor, cover 7 fits over and hermetically seals casing 6, and is provided with external terminals 8 and 9 connected respectively to tap straps 4 and 5. The capacitor section 1 in the assembled capacitor is immersed, in accordance with the invention, in a dielectric liquid 10 composed of a silicone oil composition as more fully described herein, which substantially fills the interior of casing 6.

The interleaved dielectric spacers 3, which may comprise one or more sheets, are composed in accordance with the invention of sheets of recombined or reconstructed mica formed, for example, as disclosed in the above-mentioned copending Ruscetta et al. application. As disclosed therein, the recombined mica sheets may be prepared by firing natural mica at approximately 800° C. to produce delamination thereof, followed by comminution in water to produce relatively minute flakes of mica in a slurry which is thereafter transferred to a deckle box or a special paper making machine where the water is drawn off and a tight, moist mat of minute mica flakes is left behind. The mat is then dried at 100–150° C. in an oven, and the resulting product comprises overlapping randomly arranged minute flakes of pure mica bound together by the natural molecular forces between the flakes to constitute a self-supporting sheet which, in contrast to natural mica, is fluid-pervious in all directions including transverse to the faces or planes of the flakes.

The recombined mica sheets thus formed, however, without further treatment do not have sufficient mechanical strength to allow them to be easily wound into capacitor rolls. On the other hand, the impregnation or coating of such recombined mica sheets with solid materials such as resins for strengthening the sheets has not heretofore been considered feasible to adapt the sheets for rolled capacitor use, since it has generally been considered that such treatment would seal air within the dielectric sheets in voids which could not be permeated by insulating liquid, thus resulting in poor electrical properties such as low corona starting voltage.

We have discovered, however, that by impregnating the recombined mica sheets with a low viscosity silicone resin solution and controlling to a particular range the resin content of the treated sheet, the mica sheets are thereby endowed with considerably improved mechanical strength making them adaptable for capacitor winding procedures, and having the further desirable result that isolated voids are not formed therein which cannot be permeated by a dielectric liquid. There is thus produced, in accordance with the invention, a dielectric material which retains all the desirable electrical characteristics of mica paper and overcomes limitations imposed by its low tensile strength. The silicone resin treatment, as an illustration, increases the tensile strength of a 0.7 mil mica paper from 0.4–0.7 pound/inch width to 3.5–4.5 pounds/inch width.

The resin which is used to impregnate the recombined mica sheet is of the type described in Rochow Patents 2,258,218 and 2,258,222. In general it may be stated that these resins comprise a plurality of silicon atoms linked to each other through an oxygen atom, the silicon atoms containing hydrocarbon groups attached thereto by carbon-silicon linkages. These resinous organopolysiloxanes contain an average of above 1 and less than 2, and usually within the range of from about 1.1 to 1.7, hydrocarbon radicals per silicon atom. They are soluble in various solvents, e.g. toluene and xylene, and are converted to the hardened state when heated at elevated temperatures, particularly in the presence of metallo-organic salts, such as those described in the Welsh Patent 2,449,572.

On a more precise basis these resins are obtained by cohydrolyzing a mixture of methyl chlorosilanes, for example dimethyldichlorosilane, trimethylchlorosilane, with phenylchlorosilanes, for example diphenyldichlorosilane, phenyltrichlorosilane. Condensation of these hydrolysis products give thermosetting hornlike materials, referred to herein as methyl phenyl polysiloxane resins.

Good electrical and mechanical properties are obtained from resins made from the following mixtures of organochlorosilanes:

35% to 65% methylchlorosilanes, for example, dimethyldichlorosilane, methyltrichlorosilane, plus 35% to 65% phenylchlorosilanes, for example, diphenyldichlorosilane, phenyltrichlorosilane. A preferred composition is a mixture of 40% dimethyldichlorosilane plus a 60% mixture of diphenyldichlorosilane and phenyltrichlorosilane.

These methyl and phenyl chlorosilanes are cohydrolyzed, and can be bodied if desired in a manner described in Nelson Patent 2,579,332, dissolved in toluene or xylene and impregnated into the recombined mica sheets, after which the resin is converted to the hardened state by heating at elevated temperatures (100° C. to 250° C.) particularly in the presence of metallo-organic salts, such as those described in Welsh Patent 2,449,572.

The resin content of the impregnated mica sheet is preferably in the range of about 2%–25%, with a content of about 10% being of most practical use. A resin content below 2% will not usually give sufficient strength to the mica sheet, while a higher resin content than the maximum of the mentioned range will cause excessively low corona starting voltage as well as embrittlement of the mica sheet.

A typical procedure in impregnating the mica dielectric sheet and the manner of assembling and treating the capacitor components are set forth in detail hereinafter.

The silicone oil insulating filler material in which the wound impregnated capacitor section 1 is immersed and which permeates the interstices of the impregnated mica sheet is of the group of liquid organo-siloxane compositions including alkyl and aromatic organo-siloxanes wherein the organic radicals are attached to the silicon atom through carbon-silicon linkage. Liquid organosiloxane compositions of this type are disclosed, for example, in MacGregor et al. Patent 2,389,804 issued November 27, 1945. Preferably the liquid siloxanes or silicone oils suitable for the invention have an average of approximately one to approximately two organic radicals per silicon atom. A practically suitable group of polymeric organo-siloxanes for use as insulating liquids in the present capacitors are the methyl silicones as represented by the formula

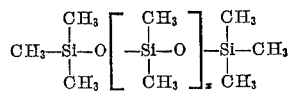

where $x$ denotes the number of dimethyl siloxane repeating units. While in general compounds of this type have been found usable where $x$ equals any value from 0–356, we prefer to use compositions where $x$ ranges from 3–356, corresponding to viscosities of 1–1000 centistokes. Even higher viscosities are not excluded, however, in view of the elevated temperatures at which the present capacitor units may be employed.

The silicone oil dielectric liquid is preferably fortified by a suitable stabilizing additive, such as disclosed in copending application Serial No. 439,162—Petley, filed June 24, 1954 and assigned to the same assignee as the present invention, in order to further prolong the life of the capacitor at the elevated temperatures.

A typical insulating liquid of the above type which may be used in the present invention is one wherein $x$ is about 90, providing a compound of 100 centistokes viscosity. This compound has the following properties:

*Table I*

| | |
|---|---|
| Melting point ° C | −55 |
| Density 25°/25° C | .968 |
| Dielectric constant 60 cycles, 20° C | 2.78 |
| Power factor | .0001 |

The silicone oil used may incorporate, for example, about 0.1% by weight of anthraquinone as a stabilizer. Other stabilizers and proportions thereof suitable for use herein are disclosed in the above-mentioned Petley application.

The following table shows the results of the tests comparing the electrical properties at various temperatures of capacitors having recombined mica sheets impregnated with a silicone resin in accordance with the invention (designated as "impregnated") and capacitors having recombined mica sheet not so impregnated (designated "plain"), the capacitors in both cases being treated with silicone oil insulating liquid stabilized with 0.1% anthraquinone:

*Table II*

| Temp., ° C. | I.R. Megohm, μf. | | P.F., Percent | | C.S.V., V./mil | |
|---|---|---|---|---|---|---|
| | Plain | Impreg. | Plain | Impreg. | Plain | Impreg. |
| 25 | 6,700 | 14,600 | .08 | .12 | 1,000 | 930 |
| 125 | 208 | 832 | .42 | .25 | | |
| 200 | 21 | 37 | 1.67 | .54 | 800 | 800 |
| 250 | | 10 | | .62 | | |

The above results show that the present resin impregnated mica sheets in combination with the silicone insulating liquid confer superior properties to the capacitors in terms of insulation resistance (I.R.) and power factor (P.F.), with practically no reduction in the high level of corona starting voltage (C.S.V.). Of particular significance is the fact that the present dielectric material lends itself to the severe handling involved in the capacitor roll winding process, in contrast to the relatively low mechanical strength of the untreated recombined mica sheets which cannot be so handled in practice.

Life tests made on two capacitors incorporating resin impregnated recombined mica sheets permeated with silicone oil dielectric liquid, wherein the samples were tested at 200° C. and pulses of 3500 volts, showed that no dielectric failures occured up to 1033 hours and 2476 hours respectively. These life periods are not even remotely approached by known rolled-type capacitors having equivalent electrical properties, which are suitable for use at temperatures above 150° C.

The following procedure is illustrative of the process of making the improved high temperature capacitor in accordance with the invention, it being understood that the invention is not limited to the particular process described.

An elongated sheet of recombined mica about .8 mil thick is conducted at room temperature through a bath containing a resin solution of methyl phenyl polysiloxane in toluene. For a final resin content in this sheet of about 2–12%, the resin solution should contain about 5% solids, and for about 12–25% final resin content the solution should contain about 10% solids. Other factors affecting the final resin content are the linear speed of passage of the sheet through the treating solution, the particular resin used, and the treating method. The resin impregnated sheet is then conducted through a heating tower at about 120° C. to drive off the solvent from the resin solution and to initiate cure of the resin. In general, the heating is continued for a sufficient period to avoid tackiness in the mica sheet.

The capacitor roll section is then formed on a winding machine which winds into a single roll two metallic foils separated by a plurality of sheets of recombined mica impregnated by the above process. During the winding, tap straps are inserted at suitable locations in the roll to provide means for making contact with the metal foils.

The roll is then placed in a metal can serving as the capacitor casing, the necessary connections of the taps to the terminals on the cover of the can are made, and the cover placed on the can, the cover being provided with a fill aperture. The capacitor is then treated by a pre-baking process for 9–18 hours at about 135° C. and then vacuum dried for 50–75 hours at the same temperature. The casing with the contained roll is then filled with silicone oil of the type above described at about 125° C., after which the capacitor section is allowed to vacuum soak and then air soak at 125° C. Finally the cover is hermetically sealed at about 150° C.

The above process is merely illustrative of a typical method and wide variations may be made therein without going beyond the scope of the invention. For example, there is evidence that pre-baking the resin impregnated mica sheet for several hours at 200° C., particularly where the resin was incompletely polymerized, produces considerable improvement in the insulation resistance and power factor of the finished dielectric material.

Capacitors produced in accordance with the invention can withstand extreme temperature conditions, being suitable for use in range of −55 to 200° C. and even higher. By virtue of its dielectric construction it can be made of much smaller size and less weight than comparable known types of capacitors. Due to the unique combination of silicone resin impregnant and silicone oil insulating liquid employed in the present invention, the mica dielectric base sheet is not only endowed with greater strength to withstand winding operations but also remains permeable to the silicone insulating liquid so as to have a high corona starting voltage notwithstanding the solid resin impregnation. As a result, the invention makes it possible to economically produce a high voltage, high temperature capacitor which has excellent life characteristics even at temperatures at 200° C. and above.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What we claim as new and desire to secure by Letters Patent of the United States is:

1. A capacitor comprising spaced armatures and dielectric material between said armatures, said dielectric material comprising minute flakes of mica recombined into a sheet, said recombined mica sheet being impregnated with a silicone resin and being permeated with a silicone oil insulating liquid, the amount of said resin being sufficient to provide substantial flexural strength to said recombined mica sheet.

2. A capacitor comprising a wound roll of spaced electrically conducting foils and a dielectric material between said foils, said dielectric material comprising minute flakes of mica recombined into a sheet, said recombined mica sheet being impregnated with a silicone resin and being permeated with a silicone oil insulating liquid, the amount of said resin being sufficient to provide substantial flexural strength to said recombined mica sheet.

3. A capacitor comprising spaced armatures and dielectric material between said armatures, said dielectric material comprising minute flakes of mica recombined into a sheet, said recombined mica sheet being impregnated with a resin composed of methyl phenyl polysiloxane and being permeated with an organo-siloxane insulating liquid, the amount of said resin being sufficient to provide substantial flexural strength to said recombined mica sheet.

4. A capacitor comprising spaced armatures and dielectric material between said armatures, said dielectric material comprising minute flakes of mica recombined into a sheet, said recombined mica sheet being impregnated with a resin composed of methyl phenyl polysiloxane, said recombined mica sheet having a resin content of 2–25% and being permeated with an organo-siloxane insulating liquid.

5. A capacitor comprising a wound roll of spaced electrically conducting foils and a dielectric material between said foils, said dielectric material comprising minute flakes of mica recombined into a sheet, said recombined mica sheet being impregnated with a resin composed of methyl phenyl polysiloxane so as to have a resin content of about 2–25% and being permeated with an organo-siloxane insulating liquid.

6. A capacitor comprising a wound roll of spaced electrically conducting foils and a dielectric material between said foils, said dielectric material comprising minute flakes of mica recombined into a sheet, said recombined mica sheet being impregnated with a resin composed of the cohydrolysis product of about 35% to 65% by weight of methylchlorosilane and about 65% to 35% by weight of phenylchlorosilane, said recombined mica sheet having a resin content of about 2–25% and being permeated with a methyl silicone insulating liquid having a viscosity of about 100 centistokes.

References Cited in the file of this patent

UNITED STATES PATENTS

| | | |
|---|---|---|
| 2,322,214 | Kirkwood | June 22, 1943 |
| 2,465,296 | Swiss | Mar. 22, 1949 |

FOREIGN PATENTS

| | | |
|---|---|---|
| 679,330 | Great Britain | Sept. 17, 1952 |